Figure 1:
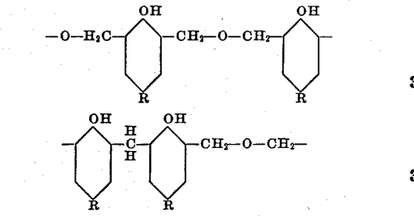

June 19, 1951  M. DE GROOTE ET AL  2,557,081
PROCESS FOR BREAKING PETROLEUM EMULSIONS
Filed Nov. 28, 1949

INVENTORS,
MELVIN DE GROOTE
BERNHARD KEISER
BY Wells L. Church
ATTORNEY.

UNITED STATES PATENT OFFICE 2,557,081

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware Application November 28, 1949, Serial No. 129,707

9 Claims. (Cl. 252—331)

This invention relates to processes or procedures particularly adapted for preventing, breaking, or resolving emulsions of the water-in-oil type, and particularly petroleum emulsions, our present application being a continuation-in-part of our co-pending application, Serial No. 82,704, filed March 21, 1949, now Patent 2,499,370, granted March 7, 1950.

Complementary to the above aspect of our invention is our companion invention concerned with the new chemical products or compounds used as the demulsifying agents in the processes or procedures herein described, as well as the application of such chemical compounds, products, and the like, in various other arts and industries, along with methods for manufacturing said new chemical products or compounds which are of oustanding value in demulsification. See our application Serial 8,731, filed February 16, 1948, and Serial No. 42,134, filed August 2, 1948, both now abandoned.

In our co-pending application Serial No. 82,704, filed March 21, 1948, the invention therein described is concerned with a process for breaking petroleum emulsions of the water-in-oil type, characterized by subjecting the emulsion to the action of a demulsifier including hydrophile synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

The present invention is subgeneric to the invention described in the aforementioned co-pending application Serial No. 82,704, now Patent 2,499,370, with one additional minor change. In the first place, R is not limited to 12 carbon atoms, but may have 14 carbon atoms. In the second place, instead of the alkylene oxide being selected from the five oxides mentioned, it is limited to the use of two oxides, i. e., ethylene oxide and propylene oxide, with the further proviso that both oxides must be used in each instance, and in addition the final product of reaction correlated to the percentage weight of initial reactants, must come within the trapezoidal area defined by points 1, 2, 3 and 4 of the chart in the accompanying drawing, all of which is a conventional representation. Also, as previously pointed out, in the instant invention, the side chain R may have as many as 14 carbon atoms.

Our present invention provides an economical and rapid process for resolving petroleum emulsions of the water-in-oil type that are commonly referred to as "cut oil," "roily oil," "emulsified oil," etc., and which comprise fine droplets of natturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

In our aforementioned co-pending application Serial No. 82,704, filed March 21, 1949, we have described certain new products or compositions of matter which are of unusual value in certain industrial applications requiring the use of products or compounds showing surface-activity. We have found that if solvent-soluble resins are prepared from difunctional (directive) phenols in which one of the reactive (o or p) positions of the phenol is substituted by a hydrocarbon radical having 4 to 12 carbon atoms, in the substantial absence of trifunctional phenols, and aldehydes having not over 8 carbon atoms, subsequent oxyalkylation, and specifically oxyethylation, yields products of unusual value for demulsification purposes, provided that oxyalkylation is continued to the degree that hydrophile properties are imparted to the compound. By "substantial absence of trifunctional phenols," we mean that such materials may be present only in amounts so small that they do not interfere with the formation of a solvent-soluble resin product, and especially, of a hydrophile oxyalkylated derivative thereof. The actual amounts to be tolerated will, of course, vary with the nature of the other components of the system; but in general, the proportion of trifunctional phenols which is tolerable in the conventional resinification procedures illustrated herein is quite small. In experiments following conventional procedures using an acid catalyst in which we have included trifunctional phenols in amounts of from 3% to about 1% or somewhat less, based on the difunctional phenols, we have encountered difficulties in preparing oxyalkylated derivatives of the type useful in the practice of this invention.

Such products are rarely a single chemical compound, but are almost invariably a mixture of cogeners. One useful type of compound may be exemplified in an idealized simplification in the following formula:

which, in turn, is considered a derivative of the fusible, organic solvent-soluble resin polymer.

In these formulas $n''$ represents a numeral varying from 1 to 13 or even more, provided that the parent resin is fusible and organic solvent-soluble; $n'$ represents a numeral varying from 1 to 20, with the proviso that the average value of $n'$ be at least 2; and R is a hydrocarbon radical having at least 4 and not over 12 carbon atoms. These numerical values of $n'$ and $n''$ are, of course, on a statistical basis.

Said previously described invention or inventions involves the use, as a demulsifier, of a hydrophile oxyalkylated 2,4,6 (i. e., 2, 4 or 6) $C_4$ to $C_{12}$-hydrocarbon substituted monocyclic phenol—$C_1$ to $C_8$ aldehyde resin in which the ratio of oxyalkylene groups to phenolic nuclei is at least 2:1 and the alkylene radicals of the oxyalkylene groups are ethylene, propylene, butylene, hydroxypropylene or hydroxybutylene corresponding to the alpha-beta alkylene oxides, ethylene oxide, alpha-beta propylene oxide, alpha-beta butylene oxide, glycide and methyl glycide.

We have found that if one uses both propylene oxide and ethylene oxide as the oxyalkylating agent in certain predetermined ratios, as hereinafter described, in a large number of instances one obtains a much better demulsifier than is possible by the use of either alkylene oxide alone in the absence of the other alkylene oxides.

Stated another way, the same resins described in the aforementioned co-pending applications are employed as a raw material and subjected to oxyethylation with both ethylene oxide and propylene oxide. For this reason, the initial description of the raw materials used for oxyalkylation, i. e., the resins themselves, is substantially the same as that which appears in various of our aforementioned co-pending applications, and particularly the subject-matter so far as the description of the resins goes, is substantially the same as that which appears in Serial No. 82,704, filed March 21, 1949.

More particularly, the present invention involves the use, as a demulsifier, of a compound having the following characteristics:

(1) Essentially a polymer, probably linear, but not necessarily so, having at least 3 and preferably not over 15 or 20 phenolic or structural units. It may have more, as previously stated.

(2) The parent resin polymer being fusible and organic solvent-soluble, as hereinafter described.

(3) The parent resin polymer being free from cross-linking, or structure, which cross-links during the heating incident to the oxyalkylation procedure to an extent sufficient to prevent the possession of hydrophile, or sub-surface-active or surface-active properties by the oxyalkylated resin. Minor proportions of trifunctional phenols sometimes present in commercial difunctional phenols are usually harmless.

(4) Each alkyleneoxy group is introduced at the phenolic hydroxyl position, except possibly, in an exceptional instance where a stable methylol group has been formed by virtue of resin manufacture in presence of an alkaline catalyst. Such occurrence of a stable methylol radical is the exception, rather than the rule, and in any event, apparently does not occur when the resin is manufactured in the presence of an acid catalyst.

(5) The total number of alkyleneoxy radicals introduced must be at least equal to twice the phenolic nuclei.

(6) The number of alkyleneoxy radicals introduced not only must meet the minimum of item (5) above, but also must be sufficient to endow the product with sufficient hydrophile property to have emulsifying properties, or be self-emulsifiable or self-dispersible, or the equivalent, as hereinafter described. The invention is concerned particularly with the use of sub-surface-active and surface-active compounds.

(7) The use of a product derived from a para-substituted phenol is advantageous, as compared with the use of a product derived from an ortho-substituted phenol, when both are available. This preference is based, in part, on the fact that the para-substituted phenol is usually cheaper, and also where we have been able to make a comparison, it appears to be definitely better, in improviding the effectiveness of demulsifiers.

(8) The alkylene oxides used must be a combination of ethylene oxide and propylene oxide in the predetermined proportions hereinafter specified.

We have found when oxyalkylated derivatives are obtained conforming to the above specifications, particularly in light of what is said hereinafter in greater detail, that they have unusual properties which can be better understood perhaps in light of the following:

(a) The property is not uniformly inherent in every analogous structure, for the reason that if the methylene group is replaced by sulfur, for example, we have found such compounds to be of lesser value.

(b) Similarly, the property is not uniformly inherent in every analogous structure, for the reason that if R is replaced by some other substituent, for instance, chlorine, the compounds obtained are of a reduced value, in comparison with the outstanding compounds derived, for example, from difunctional butylphenol, difunctional amylphenol, difunctional octylphenol, difunctional menthyl phenol, difunctional dodecyl phenol, difunctional nonyl phenol, etc.

(c) We know of no theoretical explanation of the unusual properties of this particular class of compounds, and, as a matter of fact, we have not been able to find a satisfactory explanation even after we have prepared and studied several hundred typical compounds.

We have also found that the remarkable properties of the parent materials as demulsifiers persist in derivatives which bear a simple genetic relationship to the parent material, and in fact to the ultimate resin polymer, for instance, in the products obtained by reaction of the oxyalkylated compounds with low molal monocarboxy acids, high molal monocarboxy acids, polycarboxy acids or their anhydrides, alpha-chloro monocarboxy acids, epichlorohydrin, etc. The derivatives also preferably must be obtained from oxyalkylated products showing at least the necessary hydrophile properties per se.

As previously stated, the present invention is concerned primarily with the resolution of petroleum emulsions of the water-in-oil type by means of certain specified demulsifiers. The specified demulsifiers are the products obtained by the oxyalkylation of certain resins, which in turn are derived by chemical reaction between difunctional monohydric phenols and a reactive aldehyde such as formaldehyde, nearby homologues, and their equivalents. The phenolic reactant is characterized by one ortho-para nuclear hydrocarbon substituent having not less than 4 carbon atoms and not more than 14 carbon atoms. Usually the phenolic reactants are derivatives of hydroxybenzene, i. e., ordinary phenol, and are usually obtained by reaction of phenol with an olefin or an organic chloride in presence of a metallic halide or condensing agent, but similar phenolic reactants obtained from metacresol or 3, 5-xylenol are equally satisfactory for the reason that such phenols are still difunctional (direactive) and the presence of the single or even both methyl radicals does not materially affect the sub-surface-activity or the surface activity or hydrophile balance. The hydrocarbon substituent having 4 to 14 carbon atoms may be alkyl, alkylene, aryl, alicyclic or aralkyl.

Any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalis. On the other hand, higher aldehydes frequently beneficially affect the solubility and fusibility of a resin. This is illustrated, for example, by the different characteristics of the resin prepared from paratertiary amyl phenol and formaldehyde on one hand and a comparable product prepared from the same phenolic reactant and heptaldehyde on the other hand. The former, as shown in certain subsequent examples, is a hard, brittle solid, whereas the latter is soft and tacky, and obviously easier to handle in the subsequent oxyalkylation procedure.

Cyclic aldehydes may be employed, particularly benzaldehyde. The employment of furfural requires careful control for the reason that in addition to its aldehydic function, furfural can form vinyl condensations by virtue of its unsaturated structure. The production of resins from furfural for use in preparing products for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes although usually this has no advantage.

Resins of the kind which are used as intermediates for the compounds used in the practice of this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts they enter into the condensation reaction and, in fact, may operate by initial combination with the aldehydic reactant. The compound hexamethylenetetramine illustrates such a combination. In light of these various reactions, it becomes difficult to present any formula which would depict the structure of the various resins prior to oxyalkylation. More will be said subsequently as to the difference between the use of an alkaline catalyst, and an acid catalyst; even in the use of an alkaline catalyst, there is considerable evidence to indicate that the products are not identical where different basic materials are employed. The basic materials employed include not only those previously enumerated, but also the hydroxides of the alkali metals, hydroxides of the alkaline earth metals, salts of strong bases and weak acids such as sodium acetate, etc.

Suitable phenolic reactants include the following: Para-tertiarybutylphenol; para-secondarybutylphenol; para-tertiary-amylphenol; parasecondary-amylphenol; para-tertiary-hexylphenol; para-isooctylphenol; orthophenylphenol; para-phenylphenol; ortho-benzylphenol; para-benzylphenol; para-cyclohexylphenol; para-decylphenol; para-dodecylphenol; para-nonylphenol; para-menthylphenol; para-betanaphthylphenol; para-alphanaphthylphenol; para-cumylphenol; phenols of the formula:

in which $R_1$ represents a straight chain hydrocarbon radical containing at least 7 carbon atoms and $R_2$ and $R_3$ represent hydrocarbon radicals, the total number of carbon atoms attached to the tertiary carbon being 11; and phenols of the formula:

in which $R_1$ represents an alkyl hydrocarbon radical containing at least 7 carbon atoms and $R_2$ represents an alkyl hydrocarbon radical containing at least 2 carbon atoms, the total number of carbon atoms in $R_1$ and $R_2$ being 11; and the corresponding ortho-para-substituted metacresols and 3,5-xylenols.

For convenience, the phenol has previously been referred to as monocyclic, in order to differentiate from fused nucleus polycyclic phenols, such as substituted naphthols. Specifically, "monocyclic" is limited to the nucleus in which the hydroxyl radical is attached. Broadly speaking, where a substituent is cyclic, particularly aryl, obviously, in the usual sense, such phenol is actually polycyclic, although the phenolic hydroxyl is not attached to a fused polycyclic nucleus. Stated another way, phenols in which the hydroxyl group is directly attached to a condensed or fused polycyclic structure, are excluded. This matter, however, is clarified by the following consideration. The phenols herein contemplated for reaction may be indicated by the following formula:

in which R is selected from the class consisting of hydrogen atoms and hydrocarbon radicals having at least 4 carbon atoms and not more than 14 carbons atoms, with the proviso that one occurence of R is the hydrocarbon substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a hydrocarbon substituent located in the 2,4,6 position, again with the provision as to 3 or 3,5 methyl substitution. This is conventional nomenclature, numbering the various positions in the usual clockwise manner, beginning with the hydroxyl position as one:

The manufacture of thermoplastic phenol-aldehyde resins, particularly from formaldehyde and a difunctional phenol, i. e., a phenol in which one of the three reactive positions (2,4,6) has been substituted by a hydrocarbon group, and particularly by one having at least 4 carbon atoms and not more than 12 carbon atoms, is well known. As has been previously pointed out, there is no objection to a methyl radical provided it is present in the 3 or 5 position.

Thermoplastic or fusible phenol-aldehyde resins are usually manufactured for the varnish trade and oil solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins in that phenol, being water-soluble, reacts readily with an aqueous aldehyde solution without further difficulty, while when a water-insoluble phenol is employed some modification is usually adopted to increase the interfacial surface and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous as hereinafter described in detail. Another variation of procedure is to employ such organic sulfo-acids, in the form of their salts, in connection with an alkali-catalyzed resinification procedure. Detailed examples are included subsequently.

Another advantage in the manufacture of the thermoplastic or fusible type of resin by the acid catalytic procedure is that, since a difunctional phenol is employed, an excess of an aldehyde, for instance formaldehyde, may be employed without too marked a change in conditions of reaction and ultimate product. There is usually little, if any, advantage, however, in using an excess over and above the stoichiometric proportions for the reason that such excess may be lost and wasted. For all practical purposes the molar ratio of formaldehyde to phenol may be limited to 0.9 to 1.2, with 1.05 as the preferred ratio, or sufficient, at least theoretically, to convert the remaining reactive hydrogen atom of each terminal phenolic nucleus.. Sometimes when higher aldehydes are used an excess of aldehydic reactant can be distilled off and thus recovered from the reaction mass. This same procedure may be used with formaldehyde and excess reactant recovered.

When an alkaline catalyst is used the amount of aldehyde, particularly formaldehyde, may be increased over the simple stoichiometric ratio of one-to-one or thereabouts. With the use of alkaline catalyst it has been recognized that considerably increased amounts of formaldehyde may be used, as much as two moles of formaldehyde, for example, per mole of phenol, or even more, with the result that only a small part of such aldehyde remains uncombined or is subsequently liberated during resinification. Structures which have been advanced to explain such increased use of aldehydes are the following:

Such structures may lead to the production of cyclic polymers instead of linear polymers. For this reason, it has been previously pointed out that, although linear polymers have by far the most important significance, the present invention does not exclude resins of such cyclic structures.

Sometimes conventional resinification procedure is employed using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

It may be well to point out, however, that the amount of formaldehyde used may and does usually affect the length of the resin chain. Increasing the amount of the aldehyde, such as formaldehyde, usually increases the size or molecular weight of the polymer.

In the hereto appended claims there is specified, among other things, the resin polymer containing at least 3 phenolic nuclei. Such minimum molecular size is most conveniently determined as a rule by cryoscopic method using benzene, or some other suitable solvent, for instance, one of those mentioned elsewhere herein as a solvent for such resins. As a matter of fact, using the procedures herein described or any conventional resinification procedure will yield products usually having definitely in excess of 3 nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent example, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921)). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co. 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfo-acid and a mineral acid, along with a suitable solvent, such as xylene, as hereinafter illustrated in detail. However, we have obtained products from resins obtained by use of an alkaline catalyst which were just as satisfactory as those obtained employing acid catalysts. Sometimes a combination of both types of catalysts is used in different stages of resinification. Resins so obtained are also perfectly satisfactory.

In numerous instances, the higher molecular weight resins, i. e., those referred to as high-stage resins, are conveniently obtained by subjecting lower molecular weight resins to vacuum distillation and heating. Although such procedure sometimes removes only a modest amount, or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

While under the usual conditions of resinification employing difunctional phenols, there is little or no tendency to form binuclear compounds, i. e., dimers, resulting from the combination, for example, of two moles of a phenol and one mole of formaldehyde, where the substituent which makes the phenol difunctional has not more than 4 or 5 carbon atoms, with phenols in which the ortho or para-substituent approximates the upper limit specified herein, for instance, 10 or 12, there is an increased tendency to form a measurable amount of dimers. This formation of a measurable but nevertheless relatively small amount of dimers, is unimportant and there is no reason to separate the dimers prior to oxyalkylation and use. Substituted dihydroxydiphenylmethanes obtained from substituted phenols are not resins as that term is used herein.

Although any conventional procedure ordinarily employed may be used in the manufacture of the herein contemplated resins, or, for that matter, such resins may be purchased in the open market, we have found it particularly desirable to use the procedures described elsewhere herein, and employing a combination of an organic sulfoacid and a mineral acid as a catalyst, and xylene as a solvent. By way of illustration, certain subsequent examples are included, but it is to be understood the herein described invention is not concerned with the resins per se, or with any particular method of manufacture, but is concerned with the use of derivatives obtained by the subsequent oxyalkylation thereof. The phenol-aldehyde resins may be prepared in any suitable manner.

Oxyalkylation, that is, from the specific standpoint of the present application, i. e., oxyethylation and oxypropylation, depends upon contact between the non-gaseous phase and a gaseous phase. This applies particularly to oxyethylation. However, since oxypropylation is apt to be conducted at a temperature above the boiling point of propylene oxide, it applies in regard to oxypropylation also. For the sake of simplicity and also for ease of comparison with our aforementioned co-pending application, Serial No. 82,704, filed March 21, 1949, we will refer to oxyethylation first in somewhat greater detail. Needless to say, oxyethylated resins can be subjected to oxypropylation as a further step to produce products of the kind herein specified.

Oxypropylation can be carried out by melting the thermoplastic resin and subjecting it to treatment with propylene oxide, or by treating a suitable solution or suspension. Since the melting points of the resins are often higher than desired in the initial stage of oxyethylation, we have found it advantageous to use a solution or suspension of thermoplastic resin in an inert solvent, such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage, if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used it is advantageously added at the beginning of the resinification procedure or before the reaction has proceeded very far.

The solvent can be removed afterwards by distillation with or without the use of vacuum, and a final higher temperature can be employed to complete reaction if desired. In many instances it is most desirable to permit part of the solvent, particularly when it is inexpensive, e. g., xylene, to remain behind in a predetermined amount so as to have a resin which can be handled more conveniently in the oxyalkylation stage. If a more expensive solvent, such as decalin, is employed, xylene or other inexpensive solvent may be added after the removal of decalin, if desired.

In preparing resins from difunctional phenols it is common to employ reactants of technical grade. The substituted phenols herein contemplated are usually derived from hydroxybenzene. As a rule, such substituted phenols are comparatively free from unsubstituted phenol. We have generally found that the amount present is considerably less than 1% and not infrequently in the neighborhood of $\frac{1}{10}$ of 1%, or even less. The amount of the usual trifunctional phenol, such as hydroxybenzene or metacresol, which can be tolerated is determined by the fact that actual cross-linking, if it takes place even infrequently, must not be sufficient to cause insolubility at the completion of the resinification stage or the lack of hydrophile properties at the completion of the oxyalkylation stage.

The exclusion of such trifunctional phenols as hydroxybenzene or metacresol is not based on the fact that the mere random or occasional inclusion of an unsubstituted phenyl nucleus in the resin molecule or in one of several molecules, for example, markedly alters the characteristics of the oxyalkylated derivative. The presence of a phenyl radical having a reactive hydrogen atom available or having a hydroxymethylol or a substituted hydroxymethylol group present is a potential source of cross-linking either during resinification or oxyalkylation. Cross-linking leads either to insoluble resins or to non-hydrophilic products resulting from the oxyalkylation procedure. With this rationale understood, it is obvious that trifunctional phenols are tolerable only in a minor proportion and should not be present to the extent that insolubility is produced in the resins, or that the product resulting from oxyalkylation is gelatinous, rubbery, or at least not hydrophile. As to the rationale of resinification, note particularly what is said hereafter in differentiating between resoles, Novolaks, and resins obtained solely from difunctional phenols.

It should be noted that where the substituent has 9 to 14 carbon atoms, as in certain of the phenols used in preparing the products used in accordance with the present invention, the tolerance for trifunctional phenols is substantially greater than it is with phenols in which the substituent is a lower hydrocarbon group.

Previous reference has been made to the fact that fusible organic solvent-soluble resins are usually linear, but may be cyclic. Such more complicated structure may be formed, particularly if a resin prepared in the usual manner is converted into a higher stage resin by heat treatment in vacuum, as previously mentioned. This again is a reason for avoiding any opportunity for cross-linking due to the presence of any appreciable amount of trifunctional phenol. In other words, the presence of such reactant may cause cross-linking in a conventional resinification procedure, or in the oxyalkylation procedure, or in the heat and vacuum treatment, if it is employed as part of resin manufacture.

Our routine procedure, in examining a phenol for suitability for preparing products to be used in practising the invention, is to prepare a resin employing formaldehyde in excess (1.2 moles of formaldehyde per mole of phenol) and using an acid catalyst in the manner described hereinafter in Example 1a. If the resin so obtained is solvent-soluble in any one of the aromatic or other solvents previously referred to, it is then subjected to oxyethylation. During oxyethylation a temperature is employed of approximately 150° to 165° C. with addition of at least 2 and advantageously up to 5 moles of ethylene oxide per phenolic hydroxyl. The oxyethylation is advantageously conducted so as to require from a few minutes up to 5 to 10 hours. If the product so obtained is solvent-soluble and self-dispersing or emulsifiable, or has emulsifying properties, the phenol is perfectly satisfactory from the standpoint of trifunctional phenol content. The solvent may be removed prior to the dispersibility or emulsifiability test. When a product becomes rubbery during oxyalkylation, due to the presence of a small amount of trireactive phenol, as previously mentioned, or for some other reason, it may become extremely insoluble, and no longer qualifies as being hydrophile, as herein specified. Increasing the size of the aldehydic nucleus, for instance, using heptaldehyde instead of formaldehyde, increases tolerance for trifunctional phenol.

The presence of a trifunctional or tetrafunctional phenol (such as resorcinol or bisphenol A) is apt to produce detectable cross-linking and insolubilization but will not necessarily do so, especially if the proportion is small. Resinification involving difunctional phenols only may also produce insolubilization, although this seems to be an anomaly or a contradiction of what is sometimes said in regard to resinification reactions involving difunctional phenols only. This is presumably due to cross-linking. This appears to be contradictory to what one might expect in light of the theory of functionality in resinification. It is true that under ordinary circumstances, or rather under the circumstances of conventional resin manufacture, the procedures employing difunctional phenols are very apt to, and almost invariably do, yield solvent-soluble, fusible resins. However, when conventional procedures are employed in connection with resins for varnish manufacture or the like, there is involved the matter of color, solubility in oil, etc. When resins of the same type are manufactured for the herein contemplated purpose, i. e., as a raw material to be subjected to oxyalkylation, such criteria of selection are no longer pertinent. Stated another way, one may use more drastic conditions of resinification than those ordinarily employed to produce resins for the present purposes. Such more drastic conditions of resinification may include increased amounts of catalyst, higher temperatures, longer time of reaction, subsequent reaction involving heat alone or in combination with vacuum, etc. Therefore, one is not only concerned with the resinification reactions which yield the bulk of ordinary resins from difunctional phenols but also and particularly with the minor reactions of ordinary resin manufacture which are of importance in the present invention for the reason that they occur under more drastic conditions of resinification which may be employed advantageously at times, and they may lead to cross-linking.

In this connection it may be well to point out that part of these reactions are now understood or explainable to a greater or lesser degree in light of a most recent investigation. Reference is made to the researches of Zinke and his co-workers, Hultzsch and his associates, and to von Eulen and his co-workers, and others. As to a bibliography of such investigations, see Carswell, "Phenoplasts," chapter 2. These investigators limited much of their work to reactions involving phenols having two or less reactive hydrogen atoms. Much of what appears in these most recent and most up-to-date investigations is pertinent to the present invention insofar that much of it is referring to resinification involving difunctional phenols.

For the moment, it may be simpler to consider a "most typical type" of fusible resin and forget for the time that such resin, at least under certain circumstances, is susceptible to further complications. Subsequently in the text it will be pointed out that cross-linking or reaction with excess formaldehyde may take place even with one of such "most typical type" resins. This point is made for the reason that insolubles must be avoided in order to obtain the products herein contemplated for use as demulsifying agents.

The "typical type" of fusible resin obtained from a para-blocked or ortho-blocked phenol is clearly differentiated from the Novolak type or resole type of resin. Unlike the resole type, such "typical type" para-blocked or ortho-blocked phenol resin may be heated indefinitely without passing into an infusible stage, and in this respect is similar to a Novolak. Unlike the Novolak type the addition of a further reactant, for instance, more aldehyde, does not ordinarily alter fusibility of the difunctional phenol-aldehyde type resin; but such addition to a Novolak causes cross-linking by virtue of the available third functional position.

What has been said immediately preceding is subject to modification in this respect: It is well known, for example, that difunctional phenols, for instance, paratertiaryamylphenol, and an aldehyde, particularly formaldehyde, may yield heat-hardenable resins, at least under certain conditions, as for example the use of two moles of formaldehyde to one of phenol, along with an alkaline catalyst. This peculiar hardening or curing or cross-linking of resins obtained from difunctional phenols has been recognized by various authorities.

The compounds herein used must be hydrophile or sub-surface-active or surface-active as hereinafter described, and this precludes the formation of insolubles during resin manufacture or the subsequent stage of resin manufacture where heat alone, or heat and vacuum, are employed, or in the oxyalkylation procedure. In its simplest presentation the rationale of resinification involving formaldehyde, for example, and a difunctional phenol would not be expected to form cross-links. However, cross-linking sometimes occurs and it may reach the objectionable stage. However, provided that the preparation of resins simply takes into cognizance the present knowledge of the subject, and employing preliminary, exploratory routine examinations as herein indicated, there is not the slightest difficulty in preparing a very large number of resins of various types and from various reactants, and by means of different catalysts by different procedures, all of which are eminently suitable for the herein described purpose.

Now returning to the thought that cross-linking can take place, even when difunctional phenols are used exclusively, attention is directed to the following: Somewhere during the course of resin manufacture there may be a potential cross-linking combination formed but actual cross-linking may not take place until the subsequent stage is reached, i. e., heat and vacuum stage, or oxyalkylation stage. This situation may be related or explained in terms of a theory of flaws, or Lockerstellen, which is employed in explaining flaw-forming groups due to the fact that a $CH_2OH$ radical and H atom may not lie in the same plane in the manufacture of ordinary phenol-aldehyde resins.

Secondly, the formation or absence of formation of insolubles may be related to the aldehyde used and the ratio of aldehyde, particularly formaldehyde, insofar that a slight variation may, under circumstances not understandable, produce insolubilization. The formation of the insoluble resin is apparently very sensitive to the quantity of formaldehyde employed and a slight increase in the proportion of formaldehyde may lead to the formation of insoluble gel lumps. The cause of insoluble resin formation is not clear, and nothing is known as to the structure of these resins.

All that has been said previously herein as regards resinification has avoided the specific reference to activity of a methylene hydrogen atom. Actually there is a possibility that under some drastic conditions cross-linking may take place through formaldehyde addition to the methylene bridge, or some other reaction involving a methylene hydrogen atom.

Finally, there is some evidence that, although the meta positions are not ordinarily reactive, possibly at times methylol groups or the like are formed at the meta positions; and if this were the case it may be a suitable explanation of abnormal cross-linking.

Reactivity of a resin towards excess aldehyde, for instance formaldehyde, is not to be taken as a criterion of rejection for use as a reactant. In other words, a phenol-aldehyde resin which is thermoplastic and solvent-soluble, particularly if xylene-soluble, is perfectly satisfactory even though retreatment with more aldehyde may change its characteristics markedly in regard to both fusibility and solubility. Stated another way, as far as resins obtained from difunctional phenols are concerned, they may be either formaldehyde-resistant or not formaldehyde-resistant.

Referring again to the resins herein contemplated as reactants, it is to be noted that they are thermoplastic phenol-aldheyde resins derived from difunctional phenols and are clearly distinguished from Novolaks or resoles. When these resins are produced from difunctional phenols and some of the higher aliphatic aldehydes, such as acetaldehyde, the resultant is often a comparatively soft or pitchlike resin at ordinary temperature. Such resins become comparatively fluid at 110° to 165° C. as a rule and thus can be readily oxyalkylated, preferably oxyethylated, without the use of a solvent.

Reference has been made to the use of the word "fusible." Ordinarily a thermoplastic resin is identified as one which can be heated repeatedly and still not lose its thermoplasticity. It is recognized, however, that one may have a resin which is initially thermoplastic but on repeated heating may become insoluble in an organic solvent, or at least no longer thermoplastic, due to the fact that certain changes take place very slowly. As far as the present invention is concerned, it is obvious that a resin to be suitable need only be sufficiently fusible to permit processing to produce our oxyalkylated products and not yield insolubles or cause insolubilization or gel formation, or rubberiness, as previously described. Thus resins which are, strictly speaking, fusible but not necessarily thermoplastic in the most rigid sense that such terminology would be applied to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression "water-insoluble" is used to point out this characteristic of the resins used.

In the manufacture of compounds herein employed, particularly for demulsification, it is obvious that the resins can be obtained by one of a number of procedures. In the first place, suitable resins are marketed by a number of companies and can be purchased in the open market; in the second place, there are a wealth of examples of suitable resins described in the literature. The third procedure is to follow the directions of the present application.

The polyhydric reactants, i. e., the oxyalkylation-susceptible, water-insoluble, organic solvent-soluble, fusible phenol-aldehyde resins derived from difunctional phenols, used as intermediates to produce the products used in accordance with the invention, are exemplified by Examples 1a through 103a of our Patent 2,499,370 and reference is made to that patent for examples of the oxyalkylated resins used as intermediates.

In addition, we wish to direct attention to the fact that difunctional tetradecyl phenols are available at an attractive price. One grade of these particular phenols consists of a mixture representing about 90% para-substituted phenol, 5% ortho-substituted phenol, and 5% meta-substituted phenol. Although the amount of meta-substituent is comparatively large compared with other difunctional phenols, it appears unobjectionable, due to the comparatively large side chain. For example, compare with the preparation of soluble thermoplastic phenols from cardanol, or side chain hydrogenated cardanol. We have prepared resins from such phenol alone or in admixture following the same procedure described in specific examples preceding. As a specific example, we have substituted 290 grams of this particular tetradecyl phenol in Examples 99a, 100a, and 101a of our said Patent 2,499,370, and have obtained products having similar characteristics, except that, if anything, the resins were somewhat darker and somewhat more fluid. Similarly, tetradecyl phenol can be used in combination with the other aldehydes described, and will, for practical purposes, act very similarly to dodecyl phenol.

In a number of the foregoing examples, phenols have been identified simply as "nonyl phenols," or "dodecyl phenol," or the like, without specific designation of the position of substitution or the structure of the substituent radical. In such cases the phenols meant are either the commercial products distributed under these names, or, if the products are not commercially available, the products obtained by customary syntheses from phenol, meta-cresol or 3,5-xylenol, and consist mainly of the para-substituted product, usually associated with some of the ortho-substituted product, perhaps a very small proportion of meta-substituted material, some impurities, etc. Also, it is to be understood that all of the products of the foregoing examples, unless it is otherwise stated in the example, are soluble in xylene, at least to an extent sufficient to permit the use of xylene as the solvent in oxyalkylation.

As far as the manufacture of resins is concerned, it is usually most convenient to employ a catalyst such as illustrated by previous examples.

Previous reference has been made to the use of a single phenol, as herein specified, or a single reactive aldehyde, or a single oxyalkylating agent. Obviously, mixtures of reactants may be employed, as, for example, a mixture of para-butylphenol and para-amylphenol, or a mixture of para-butylphenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei, or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends upon the relative reactivity of the aldehydes. For that matter, one might be producing simultaneously two different resins, in what would actually be a mechanical mixture, although such mixture might exhibit some unique properties, as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the oxyalkylated derivative of such resins, derived from such plurality of reactants, instead of being limited to a single reactant from each of the three classes, is contemplated and here included, for the reason that they are obvious variants. As far as the manufacture of resins is concerned it is usually most convenient to employ a catalyst such as illustrated by previous examples.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds' gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Attention is directed to the fact that resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent or the fact that it is fusible means that it consists of separate molecules. Phenol-aldehyde resins of the type herein specified possess reactive hydroxyl groups and are oxyalkylation susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare products for use in the process of the invention is to determine the hydroxyl value by the Verley-Bölsing method or its equivalent. The resin as such or in the form of a solution, as described, was then treated with a mixture of ethylene oxide and propylene oxide in presence of 0.5% to 2% of sodium methylate as a catalyst in step-wise fashion. The ratios of propylene oxide and ethylene oxide employed correspond to the ratios in the limiting points on the triangular graph, to wit, points 1, 2, 3 and 4. Our preference is to use the propylene oxide and then the ethylene oxide. If the resulting products meet the requirements as to surface-active properties noted elsewhere, the resin is entirely satisfactory. In some instances, such tests are best conducted by adding ethylene oxide first and then propylene oxide, or adding a mixture of the two alkylene oxides at the same time.

Attention is directed to the fact that in the subsequent examples reference is made to the step-wise addition of the alkylene oxide, such as ethylene oxide. It is understood, of course, that there is no objection to the continuous addition of alkylene oxide until the desired stage of reaction is reached. In fact, there may be less of a hazard involved and it is often advantageous to add the alkylene oxide, or mixture, slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C., as a rule, and thus can be readily oxyalkylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface-activity show unusual properties as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare a resin having at least 3 phenolic nuclei and being organic solvent-soluble. Oxypropylate such resin, using the six following ratios of propylene oxide per phenolic unit equivalent: 2 to 1; 4 to 1; 6 to 1; 10 to 1; 15 to 1; and 20 to 1. Each oxypropylated sample thus obtained is treated with ethylene oxide in three different ratios, the first ratio being where the amount of ethylene oxide on a molal basis is just one-half that of the propylene oxide used in oxypropylation; the second ratio being where the amount of ethylene oxide is just equal to the amount of propylene oxide used on a molal basis; and the final ratio being where the amount of ethylene oxide used is 50% more than the propylene oxide used on a molal basis. This gives a total of 18 samples, covering a fairly wide range. Prepare 0.5% and 5.0% solutions in distilled water, as previously indicated. A mere examination of such series will reveal generally an approximate range of minimum hydrophile character, moderate hydrophile character, and maximum hydrophile character. If any one of the three variations of the 2 to 1 propylene oxide ratio does not show minimum hydrophile effect by test of the solvent-free product, then one should test the capacity of the three variants to form an emulsion when mixed with xylene or other insoluble solvent. If neither test on the three variants shows the required minimum hydrophile property, further examination is required in regard to the other members of the series. Moderate hydrophile character should be shown by either a 6 to 1 or 10 to 1 ratio, based on the combined amount of both oxides. Such moderate hydrophile character is indicated by the fact that the sol in distilled water within the previously mentioned concentration range is a permanent translucent sol, when viewed in a comparatively thin layer, for instance, the depth of a test tube. See also what has been said previously in regard to testing the new resin by preparing compounds corresponding to the limiting points on the triangular graph, points 1, 2, 3 and 4. Needless to say, such series can be prepared also in addition to further evaluating either the resin itself or to give a range of derivatives for any particular use, such as demulsification.

As has been stated in the earlier text, the present invention is concerned with the use of both propylene oxide and ethylene oxide. By using a comparatively large amount of ethylene oxide and a comparatively small amount of propylene oxide (assuming that the selected combination comes within the limits hereinafter specified) one can obtain a product which gives ultimate hydrophile character. However, ultimate hydrophile character of itself is not necessarily significant because, obviously, a resin treated with 15 to 20 or 30 moles of ethylene oxide per phenolic unit, will be more water-soluble than a similar combination where one-fifth or one-third or one-half of the ethylene oxide is replaced by propylene oxide.

Therefore, even though the compounds or derivatives herein described are surface-active or sub-surface-active from the standpoint described in the co-pending application, Serial No. 82,704, filed March 21, 1949, yet the limits are carefully set out by another set of facts we describe in the text immediately following. These limits make it extremely simple to prepare combinations of resins with propylene oxide and ethylene oxide which will meet the herein described requirements.

After preparing a large number of oxyethylated derivatives of these various resins, as described in Serial No. 82,704, filed March 21, 1949, and subsequently, subjecting them to oxypropylation, we have found that not infrequently, and in fact, in many cases, the derivatives or mixtures obtained by such combined treatment yielded products of greater value for many uses, and particularly for demulsification of petroleum emulsions of the water-in-oil type. The same thing is true in regard to the oxypropylated resins described in the same aforementioned copending application, provided there was aftertreatment with ethylene oxide.

Ordinarily, the oxyalkylation is carried out in autoclaves with agitators or stirring devices. We have found that the speed of the agitation markedly influences the time reaction. In some cases, the change from slow speed agitation, for example, in a laboratory autoclave, with a stirrer operating at a speed of 60 to 200 R. P. M., to high speed agitation with the stirrer operating at 250 to 350 R. P. M., reduces the time required for oxyalkylation by one-half to two-thirds. Frequently, xylene-soluble products which give insoluble products by procedures employing comparatively slow speed agitation, give suitable hydrophile products, when produced by similar procedure, but with high speed agitation, as a result, we believe, of the reduction in the time required with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, i. e., an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

Previous reference has been made to the fact that in preparing final products or compounds of the kind herein described, particularly adapted for demulsification of water-in-oil emulsions, and for that matter for other purposes, one should make a complete exploration of the wide variation in hydrophobe-hydrophile balance, as previously referred to. It has been stated, furthermore, that this hydrophobe-hydrophile balance of the oxyalkylated resins is imparted, as far as the range of variation goes, to a greater or lesser extent to the herein described derivatives. This means that one employing the present invention should take the choice of the most suitable derivative selected from a number of representative compounds, thus, not only should a variety of resins be prepared exhibiting a variety of oxyalkylations, not only from the standpoint of a varying ethylene oxide-propylene oxide ratio, but also from a standpoint of adding one oxide first and then the other, and also from the standpoint of adding both oxides simultaneously. This can be done conveniently in light of what has been said previously. From a practical standpoint, using pilot plant equipment, for instance, an autoclave having a capacity of approximately 3 to 5 gallons, we have made a single run by appropriate selections in which the molal ratio of resin equivalent to ethylene oxide is one to one, 1 to 5, 1 to 10, 1 to 15, and 1 to 20, or the same ratios using propylene oxide, followed by addition of the other oxides through a somewhat similar range, i. e., 1 to 20 moles of propylene oxide after the initial addition of ethylene oxide, or 1 to 20 moles of ethylene oxide after the initial addition of propylene oxide. In any event, however, such ratios are conducted to keep the ultimate derivative within the trapezoidal area on the triangular graph defined approximately by points 1, 2, 3 and 4. Furthermore, in making these particular runs, we have used continuous addition of ethylene oxide, or propylene oxide.

In the continuous addition of ethylene oxide we have employed either a cylinder of ethylene oxide without added nitrogen, provided that the pressure of the ethylene oxide was sufficiently great to pass into the autoclave, or we have used an arrangement, which, in essence, was the equivalent of an ethylene oxide cylinder, with a means for injecting nitrogen so as to force the ethylene oxide in the manner of an ordinary seltzer bottle, combined with the means for either weighing the cylinder or measuring the ethylene oxide used volumetrically. In the case of propylene oxide, we invariably used nitrogen pressure to cause the oxide to move into the autoclave.

Such procedure and arrangement for injecting liquids is, of course, conventional. In adding ethylene oxide or propylene oxide continuously, there is one precaution which must be taken at all times. The addition of the oxide must stop immediately, if there is any indication that reaction is stopped, or, obviously, if reaction is not started at the beginning of the reaction period. Since the addition of ethylene oxide is invariably an exothermic reaction, whether or not reaction has taken place, can be judged in the usual manner, by observing (a) temperature rise or drop, if any; and (b) amount of cooling water or other means required to dissipate heat of reaction; thus, if there is a temperature drop without the use of cooling water or equivalent, or if there is no rise in temperature without using cooling water control, careful investigation should be made.

The resins employed are prepared in the manner described in various previous examples, Nos. 1a through 103a, inclusive. Instead of being prepared on a laboratory scale, they were prepared in 10 to 15-gallon electro-vapor heated synthetic resin pilot plant reactors, as manufactured by the Blaw-Knox Co., Pittsburgh, Pennsylvania, and completely described in their Bulletin No. 2087, issued in 1947, with specific reference to Specification No. 71–3965.

In preparing the derivatives we have used the following procedure throughout. Prepare the resins with a certain amount of solvent, such as xylene, present purely as a convenience. We have treated the resins with propylene oxide and ethylene oxide in three different ways:

(a) Add the ethylene oxide first and then the propylene oxide;

(b) Add the propylene oxide first and then the ethylene oxide; and (c) Use a mixture of propylene oxide and ethylene oxide, and make a single addition.

In each case we have used an alkaline catalyst equivalent to approximately one-half percent to 1% of the total reaction mass in the final stage, or equivalent to one-fourth percent of alkaline catalyst based on final compound. In some cases, as is obvious, such materials would be made step-wise, for the reason that it is more convenient to produce a batch of oxypropylated resin, split it into three parts, for instance, and treat it with three different ratios of propylene oxide; or, inversely, prepare an oxypropylated resin and split it into three batches and treat it with various amounts of ethylene oxide. Briefly stated, the initial exploration was based on the combined derivatives previously mentioned in the earlier part of this text. Further exploration was based on preparing the following compounds in the three different ways mentioned. For convenience at this stage the ratios are shown in molar ratio rather than weight, although as will be pointed out subsequently, it is more convenient to operate and set the limits on a weight basis. Reference to molal basis means the phenolic nucleus, plus a single adjoining bridge, i. e., the structural unit; or, stated another way, the radical attached to each phenolic hydroxyl. This reference to a molal ratio is distinguished from the obvious text, where reference is made to the molecular weight of the resin molecule as a whole, i. e., a molecule consisting of several structural units. In each case the solvent was present and the amount of solvent in the final product is shown in each case. The solvent was xylene, and in some cases, was removed by vacuum distillation for examination of the final product.

| Resin | Propylene Oxide | Ethylene Oxide | Solvent, Percent |
|---|---|---|---|
| 1 | 2 | 2 | 35 |
| 1 | 2 | 4 | 30.5 |
| 1 | 2 | 7 | 25.6 |
| 1 | 2 | 10 | 21.9 |
| 1 | 3.5 | 2.5 | 29.6 |
| 1 | 3.5 | 4.7 | 25.9 |
| 1 | 3.5 | 7 | 23.0 |
| 1 | 3.5 | 10 | 20.0 |
| 1 | 3.5 | 15 | 16.4 |
| 1 | 5 | 3 | 25.8 |
| 1 | 5 | 6 | 22.2 |
| 1 | 5 | 9 | 19.6 |
| 1 | 5 | 12 | 17.3 |
| 1 | 5 | 15 | 15.4 |
| 1 | 8 | 3 | 21.45 |
| 1 | 8 | 6 | 18.8 |
| 1 | 8 | 9 | 16.8 |
| 1 | 8 | 12 | 15.3 |
| 1 | 8 | 15 | 13.6 |
| 1 | 14 | 3 | 15.65 |
| 1 | 14 | 6 | 14.2 |
| 1 | 14 | 9 | 13.1 |
| 1 | 14 | 12 | 12.0 |
| 1 | 14 | 15 | 11.2 |
| 1 | 14 | 18 | 10.45 |
| 1 | 14 | 21 | 9.70 |

In each case a number of resins were employed, and, among others, a complete series was prepared from those resins which could be manufactured from commercially available phenols and aldehydes, such as Examples 1a, 2a, 3a, 4a, 5a, 24a, 25a of our said Patent 2,499,370 and similar resins obtained from octylphenol, nonylphenol, etc. The commercially available aldehydes used were formaldehyde, furfural, acetaldehyde, heptaldehyde, and propionaldehyde. This very complete series was tested extensively and the data examined by plotting the composition on a percentage basis on a conventional triangular chart or graph, as shown in the accompanying drawing. In this chart each vertex represented 100% of the material indicated, i. e., a phenol-aldehyde resin, ethylene oxide, or propylene oxide. Likewise, the three lines connecting the vertices represent binary mixtures of the two particular constituents. Points in the area represent composition indicated in the usual manner.

Briefly stated, exploration revealed that the most effective compositions, from the standpoint of demulsification, and for that matter for other purposes, were found within the area of the chart approximately defined by the tetrahedron whose points are 1, 2, 3 and 4. Within this tetrahedral area compounds whose compositions are found approximately within the parallelogram defined by points 3, 7, 5 and 6, were found most effective. The second most effective class of materials, from the standpoint of demulsification, were found within the tetraherdral area defined approximately by points 5, 8, 9 and 6.

The determining points in the large tetrahedron 1, 2, 3 and 4, are indicated in the following data, both on a weight basis and a molal ratio basis. Obviously, the weight basis is more satisfactory, because, as different resins are employed, the formulations for change in molecular weight of the resin unit are eliminated, to say nothing of the ease of producing the desired compounds, by merely following predetermined weight ratios indicated by the graph.

| Points | Resin | Ethylene Oxide | Propylene Oxide | Molal Ratio |
|---|---|---|---|---|
| | Per cent | Per cent | Per cent | |
| 1 | 60 | 30 | 10 | 1 M: 1.95 M: .505 M. |
| 2 | 4 | 86 | 10 | 1 M: 86 M: 7.58 M. |
| 3 | 4 | 10 | 86 | 1 M: 10 M: 65.2 M. |
| 4 | 60 | 10 | 30 | 1 M: .665 M: 1.51 M. |

A series of 9 oxyalkylated derivatives were made from 5 different resins. In this series Examples A to I, inclusive, corresponded to the 9 compositions previously identified by points in the triangular graph. For convenience, they are shown in the following table:

| Ex. No. | Point on Chart | Resin | Ethylene Oxide | Propylene Oxide |
|---|---|---|---|---|
| | | Per cent | Per cent | Per cent |
| A | 1 | 60 | 30 | 10 |
| B | 5 | 50 | 40 | 10 |
| C | 8 | 30 | 60 | 10 |
| D | 2 | 4 | 86 | 10 |
| E | 9 | 4 | 60 | 36 |
| F | 6 | 4 | 40 | 56 |
| G | 3 | 4 | 10 | 86 |
| H | 7 | 50 | 10 | 40 |
| I | 4 | 60 | 10 | 30 |

In preparing these compounds we used an autoclave which would handle approximately 15 to 50 pounds of materials conveniently. In each case a solvent was employed. If there was solvent present in the resin, as a result of manufacture, this was permitted to remain and somewhat additional solvent was added. The solvent employed throughout was xylene.

The following table shows the exact amount of materials employed, i. e., weight of resin employed, weight of ethylene oxide employed, weight of propylene oxide employed, total amount of solvent present in the reaction mass, and also the amount of flake caustic soda employed as a catalyst.

| Ex. No. | Point on Chart | Resin | Ethylene Oxide | Propylene Oxide | Weight of Xylene | Flake Caustic Soda |
|---|---|---|---|---|---|---|
| | | Pounds | Pounds | Pounds | Pounds | Ounces |
| A | 1 | 6 | 3 | 1 | 10 | 1 |
| B | 5 | 5 | 4 | 1 | 10 | 1 |
| C | 8 | 3 | 6 | 1 | 10 | 1 |
| D | 2 | 1 | 21.5 | 2.5 | 25 | 2 |
| E | 9 | 1 | 15 | 9 | 25 | 2 |
| F | 6 | 1 | 10 | 14 | 25 | 2 |
| G | 3 | 1 | 2.5 | 21.5 | 25 | 2 |
| H | 7 | 5 | 1 | 4 | 10 | 1 |
| I | 4 | 6 | 1 | 3 | 10 | 1 |

As stated, this series was made from 5 different phenol-formaldehyde resins, i. e., tertiary amylphenol, tertiary butylphenol, tertiary octylphenol, tertiary nonylphenol, and menthylphenol. In each instance the 45 derivatives were made in three different ways:

(a) Adding all the ethylene oxide first and then the propylene oxide;

(b) Adding the propylene oxide first and then the ethylene oxide;

(c) Mixing the two oxides and adding them simultaneously.

We have prepared also a number of similar derivatives in which another aldehyde, such as acetaldehyde, propionic aldehyde, or furfural, replace formaldehyde. What is said in regard to derivatives prepared from formaldehyde is also true in regard to derivatives prepared from the same, or various phenols and these other aldehydes. The subsequent oxyalkylation step, or steps, were the same. What has been said in regard to the effectiveness of derivatives derived from resins in which formaldehyde enters into the manufacture, is true also in regard to resins in which these other aldehydes are used.

We again desire to point out that the amount of alkaline catalyst used is not critical. This is true whether the catalyst be caustic soda, caustic potash, sodium methylate, or any other suitable catalyst. The amount which we regularly employed has varied from 1%, based on the resin alone, to 1%, based on the resin and oxides, although in many cases the reaction has been speeded up by using approximately twice this amount of caustic. We are inclined to believe that whenever the amount of caustic represents more than 2% of the reactants present, ignoring inert solvent, there may be some tendency to form cyclic polymers with the alkylene oxide, although this is purely a matter of speculation. For this reason, whether justified or not, we have usually avoided use of excess amounts of catalyst.

Referring now to the earlier reference as to the most suitable combinations, it will be noted, as previously stated, that they fall not only within the trapezoidal area of the chart defined by points 1, 2, 3 and 4, but more specifically, within the parallelogram which represents part of the trapezoidal area. This parallelogram is defined approximately by points 5, 6, 3 and 7. We have prepared a large number of derivatives which come within this preferred area, i. e., within the area of the parallelogram, and since such derivatives are the most effective demulsifiers, and also most effective for other purposes, we are including these data in considerable detail. It is understood, of course, in each instance the composition is based on the assumption that the percentage by weight basis is on a statistical basis, which it obviously must be, and assume completeness of reaction. This applies, of course, not only to these examples, but also to all previous examples. In preparing these examples, we have employed aliquot proportions of a larger resin solution obtained from a resin prepared in a comparatively large batch, i. e., 100 gallons. The resins so prepared happened to contain approximately a little more than 50% solvent and a little less than 50% resin. The solvent was xylene. The resin solution was oxyalkylated in an autoclave of the kind described previously, and which would conveniently handle approximately 10 pounds to 30 pounds of reactants. The resins employed in the first series of compounds, which are identified as Examples XAA1 through and including XFF1, were obtained from amylphenol resin, which, for all practical purposes, was identical with the resin described under the heading of Example 3a of our said Patent 2,499,370. The amount of resin employed, the amount of ethylene oxide employed, and the amount of propylene oxide employed, are given in pounds in the following six examples. The weight of caustic soda employed is indicated in ounces. In these particular examples all the propylene oxide was added first and then all the ethylene oxide.

| Ex. No. | Resin | Ethylene Oxide | Propylene Oxide | Wt. of Xylene | Flake Caustic |
|---|---|---|---|---|---|
| | Pounds | Pounds | Pounds | Pounds | Ounces |
| XAA1 | 6.24 | 3.25 | 4.20 | 7.36 | 1½ |
| XBB1 | 4.57 | 3.50 | 7.50 | 5.43 | 1½ |
| XCC1 | 3.45 | 2.50 | 9.05 | 4.10 | 1½ |
| XDD1 | 3.14 | 2.50 | 14.48 | 3.73 | 2 |
| XEE1 | 2.65 | 4.10 | 12.25 | 3.15 | 2 |
| XFF1 | 2.84 | 4.32 | 7.50 | 3.39 | 1½ |

A second set of six examples, designated as Examples XAA2 through XFF2, were prepared in the same manner, using the same ratios except that the resin employed was one made from butylphenol. Such resin was prepared in substantially the same manner as described in Example 1a of our said Patent 2,499,370.

The third series of six compounds were prepared using identically the same ratios, and are identified as Examples XAA3 through XFF3. These were prepared from an octylphenol resin of substantially the same type as described under the heading of Example 8a of our said Patent 2,499,370.

A fourth series of six examples were prepared using the same ratios, and identified as Examples XAA4 through XFF4, and prepared from a nonylphenol resin, substantially in the same manner as described under the heading of Example 7a, of our said Patent 2,449,370.

Similarly, a fifth series was prepared from tetradecyl phenol. The resin was prepared in substantially the same manner as Resin Example 1a, of our said Patent 2,499,370, except that the molal equivalent of tetradecylphenol was substituted for butylphenol. This series was identified as Examples XAA5 through XFF5.

A sixth series was prepared from menthylphenol.

In all these series the same ratios of reactants as indicated in Examples XAA1 through XFF1 were used. The procedure was the same as has been described previously in regard to oxyethylation and oxypropylation. In each instance the propylene oxide was added first and then the ethylene oxide.

In a second series of thirty compounds, the same ratios were preserved in every respect, except that the ethylene oxide was added first and then the propylene oxide. These series are indicated by the designations YAA1, YBB1, YCC1, YDD1, YEE1, and YFF1, for the amylphenols, and the corresponding designation for the others.

A third series was prepared using the same ratios, except that ethylene oxide and propylene oxide were mixed together and added simultaneously so that oxyalkylation was a random or indifferent oxyalkylation, in the sense that no control was employed to determine which oxide combined first with the resin. This third series is indicated by the prefix "Z" instead of "X" and "Y."

Examination of results in demulsification tests shows that the X series was best, the Y series very good, and the Z series good.

In the final comparison all the resins were on an equal dilution basis, 65% of the oxyalkylated derivatives and 35% xylene.

The oxyalkylation of a resin of the kind herein described with a properly selected alkylene oxide, will produce a material, which, if oxyalkylation is extensive enough, becomes clearly soluble in water, so that a dilute solution, for instance, 1% in water at 22.5° C. in an ordinary test tube of approximately one-half inch thickness, produces a solution or sol which is transparent to the eye. Needless to say, this does not apply to any alkylene oxide. For instance, the reaction product of a mole or a few moles of phenyl ethylene oxide with a water-soluble product, such as water, yields a water-insoluble product. The treatment of a resin with sufficient ethylene oxide will produce a product having the characteristics noted and which aparently show at least some detersive properties. Replacing the ethylene oxide with butylene oxide does not produce a water-soluble product, regardless of how much butylene oxide is used. If one replaces the butylene oxide with propylene oxide, the product will show some hydrophile effect, but does not yield a clear solution. In fact, the resultant, using propylene oxide alone, is usually a product which will dissolve in xylene, but will not even suspend in water. By using a mixture of propylene oxide and ethylene oxide one can obtain a derivative which is somewhere in between these two limits, i. e., it may suspend in water as an opaque colloidal sol, or may perhaps not do quite this well, or perhaps even better, but in any event, does not give a clear solution when tested in the manner previously indicated, and does not have any detersive properties. All the products which we have examined which come within the parallelogram on the graph indicated by points 5, 6, 3 and 7, are of this "semi-soluble" or non-detersive type.

When a hydroxylated material is subjected to oxyalkylation, particularly in such instances where a plurality of moles of the alkylene oxide are used per hydroxyl, one does not obtain a compound but a mixture, which, on a statistical basis, corresponds to the predetermined ratios.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well-fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example XAA1, with 15 parts by weight of xylene and 10 parts by weight of isopropyl alcohol, an excellent demulsifier is obtained. Selection of the solvent will vary, depending upon the solubility characteristics of the oxyalkylated product, and, of course, will be dictated in part by economic considerations, i. e., cost.

As noted above, the products herein described may be used not only in diluted form, but also may be used admixed with other chemical demulsifiers. An illustration is the use of a mixture comprising:

Oxyalkylated derivative, for example, the product of Example XAA1, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof, for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative, rather than the resin itself.

Having thus described our invention, what we claim as new and desire to secure by Letters Patent is:

1. A process for breaking petroleum emulsions of the water-in-oil type, characterized by subjecting the emulsion to the action of a demulsifier including hydrophile synthetic products; said hydrophile synthetic products being oxyalkylation products of (a) both ethylene oxide and propylene oxide; and (b) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

in which R is a hydrocarbon radical having at least 4 and not more than 14 carbon atoms and substituted in the 2,4,6 position; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation-step reactants, i. e., resin, ethylene oxide and propylene oxide, on a percentage weight basis must fall approximately within the area defined by the trapezoid, 1, 2, 3 and 4 of the chart in the accompanying drawing; and with the final proviso that the hydrophile properties of said oxyalkylated resin in an equal weight of xylene are sufficient to produce an emulsion when said xylene solution is shaken vigorously with one to three volumes of water.

2. A process for breaking petroleum emulsions of the water-in-oil type, characterized by subjecting the emulsion to the action of a demulsifier including hydrophile synthetic products; said hydrophile synthetic products being oxyalkylation products of (a) both ethylene oxide and propylene oxide; and (b) an alkylation-susceptible, fusible, organic solvent-soluble, water-insoluble, low-stage phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

in which R is a hydrocarbon radical having at least 4 and not more than 14 carbon atoms and substituted in the 2,4,6 position; said oxyalkylated resin being characterized by the introduction into the resin molecule of a plurality of divalent $C_2H_4O$ and $C_3H_6O$ radicals, with the proviso that the composition of said hydrophile synthetic products based on a satistical average and assuming completeness of reaction, and calculated back to the three oxyalkylation step reactants, i. e., resin, ethylene oxide and propylene oxide, on a percentage basis must fall approximately within the area defined by the trapezoid 1, 2, 3 and 4 of the chart in the accompanying drawing; and with the final proviso that the hydrophile properties of said oxyalkylated resin in an equal weight of xylene are sufficient to produce an emulsion when said xylene solution is shaken vigorously with one to three volumes of water.

3. A process for breaking petroleum emulsions of the water-in-oil type, characterized by subjecting the emulsion to the action of a demulsifier including hydrophile synthetic products; said hydrophile synthetic products being oxyalkylation products of (a) both ethylene oxide and propylene oxide; and (b) an oxyalkylation-susceptible, fusible, organic solvent-soluble, water-insoluble, low-stage phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

in which R is a hydrocarbon radical having at least 4 and not more than 14 carbon atoms and substituted in the 2,4,6 position; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the parallelogram 5, 6, 3 and 7, of the chart in the accompanying drawing; and with the final proviso that the hydrophile properties of said oxyalkylated resin in an equal weight of xylene are sufficient to produce an emulsion when said xylene solution is shaken vigorously with one to three volumes of water.

4. A process for breaking petroleum emulsions of the water-in-oil type, characterized by subjecting the emulsion to the action of a demulsifier including non-detersive hydrohpile synthetic products; said non-detersive hydrophile synthetic products being oxyalkylation products of (a) both ethylene oxide and propylene oxide; and (b) an oxyalkylation-susceptible, fusible, organic solvent-soluble, water-insoluble, low-stage phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

in which R is a hydrocarbon radical having at least 4 and not more than 14 carbon atoms and substituted in the 2,4,6 position; said oxyalkylated resin being characterized by the introduction into the resin molecule of a plurality of divalent $C_2H_4O$ and $C_3H_6O$ radicals, with the proviso that the composition of said non-detersive hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the parallelogram 5, 6, 3 and 7, of the chart in the accompanying drawing; and with the final proviso that the hydrophile properties of said non-detersive oxyalkylated resin in an equal weight of xylene are sufficient to produce an emulsion when said xylene solution is shaken vigorously with one to three volumes of water.

5. A process for breaking petroleum emulsions of the water-in-oil type, characterized by subjecting the emulsion to the action of a demulsifier including non-detersive hydrophile synthetic products; said non-detersive hydrophile synthetic products being oxyalkylation products of (a) both ethylene oxide and propylene oxide; and (b) an oxyalkylation-susceptible, fusible, organic solvent-soluble, water-insoluble, low-stage phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

in which R is a hydrocarbon radical having at least 4 and not more than 14 carbon atoms and substituted in the 2,4,6 position; said oxyalkylated resin being characterized by the introduction into the resin molecule of a plurality of divalent $C_2H_4O$ and $C_3H_6O$ radicals, with the proviso that the composition of said non-detersive hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the parallelogram 5, 6, 3 and 7, of the chart in the accompanying drawing; and with the further proviso that the hydrophile properties of said non-detersive oxyalkylated resin in an equal weight of xylene are sufficient to produce an emulsion when said xylene solution is shaken vigorously with one to three volumes of water; and with the final proviso that in the oxyalkylation step all the propylene oxide be added first and then the ethylene oxide.

6. The process of claim 5, wherein the aldehyde is formaldehyde.

7. The process of claim 5, wherein the aldehyde is formaldehyde and R is a butyl radical.

8. The process of claim 5, wherein the aldehyde is formaldehyde and R is an amyl radical.

9. The process of claim 5, wherein the aldehyde is formaldehyde and R is a nonyl radical.

MELVIN DE GROOTE.
BERNHARD KEISER.

REFERENCES CITED

The following references are of record in the file of this patent:

UNITED STATES PATENTS

| Number | Name | Date |
|---|---|---|
| 2,040,212 | Orthner | May 12, 1936 |
| 2,076,624 | De Groote et al. | Apr. 13, 1937 |
| 2,454,541 | Bock et al. | Nov. 23, 1948 |